US010948351B2

(12) United States Patent
Knuebel (10) Patent No.: US 10,948,351 B2
(45) Date of Patent: Mar. 16, 2021

(54) METHOD AND DEVICE FOR DETERMINING THE COLOR HOMOGENEITY OF HAIR

(71) Applicant: Henkel AG & Co. KGaA, Duesseldorf (DE)

(72) Inventor: Georg Knuebel, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 128 days.

(21) Appl. No.: 16/347,760

(22) PCT Filed: Jul. 4, 2017

(86) PCT No.: PCT/EP2017/066576
§ 371 (c)(1),
(2) Date: May 6, 2019

(87) PCT Pub. No.: WO2018/086771
PCT Pub. Date: May 17, 2018

(65) Prior Publication Data
US 2019/0285476 A1    Sep. 19, 2019

(30) Foreign Application Priority Data
Nov. 11, 2016 (DE) .................... 10 2016 222 190.6

(51) Int. Cl.
*G01J 3/46* (2006.01)
*G01J 3/02* (2006.01)
*G01J 3/52* (2006.01)

(52) U.S. Cl.
CPC ............ *G01J 3/462* (2013.01); *G01J 3/0264* (2013.01); *G01J 3/463* (2013.01); *G01J 3/465* (2013.01); *G01J 3/526* (2013.01)

(58) Field of Classification Search
CPC .......... G01J 3/462; G01J 3/0264; G01J 3/463; G01J 3/465; G01J 3/526
See application file for complete search history.

(56) References Cited

U.S. PATENT DOCUMENTS 9,607,397 B2*   3/2017   Lin ..................... H04N 5/225
2003/0067545 A1*   4/2003   Giron ..................... G03B 15/06
                                            348/223.1

(Continued)

FOREIGN PATENT DOCUMENTS

DE    102014220077 A1   4/2016
WO    2015044944 A2   4/2015

OTHER PUBLICATIONS

Fink et al., Color Homogeneity and visual perception of age, health and attractiveness of male facial skin, JEADV, 2011, pp. 1486-1492.*

(Continued)

*Primary Examiner* — John B Strege
(74) *Attorney, Agent, or Firm* — Lorenz & Kopf, LLP (57) ABSTRACT

A method and device for determining the color homogeneity of hair is provided. In accordance with various exemplary embodiments, a method comprises providing a digital image in which hair is depicted and which is parameterized in a color space which is defined by employing a parameter set in which one of the parameters is a hue, defining at least one hair analysis region in the digital image, determining a hue distribution in at least one hair analysis region, and determining at least one color homogeneity value on the basis of the determined hue distribution.

20 Claims, 7 Drawing Sheets

(56) References Cited

U.S. PATENT DOCUMENTS

| | | |
|---|---|---|
| 2007/0100555 A1 | 5/2007 | Ladjevardi |
| 2011/0194762 A1 | 8/2011 | Habing |
| 2011/0236329 A1* | 9/2011 | Sasao .................. A61Q 5/08 424/62 |
| 2012/0075331 A1* | 3/2012 | Mallick ................ G06T 11/001 345/594 |
| 2014/0118521 A1 | 5/2014 | Conti et al. |
| 2015/0002696 A1* | 1/2015 | He ...................... G06K 9/4652 348/231.6 |
| 2015/0286897 A1* | 10/2015 | Spaith ................. G06K 9/4661 382/224 |
| 2016/0071316 A1 | 3/2016 | Beeler et al. |
| 2016/0154993 A1 | 6/2016 | Aarabi |
| 2016/0209272 A1 | 7/2016 | Miklatzky et al. |
| 2017/0206678 A1 | 7/2017 | Kowalczyk et al. |

OTHER PUBLICATIONS

EPO, International Search Report issued in International Application No. PCT/EP2017/066576, dated Sep. 26, 2017.

Zhang, Gunes, Piccardi: "An accurate algorithm for head detection based on XYZ and HSV hair and skin color models—IEEE Conference Publication", (URL: http://ieeexplore.ieee.org/document/4712087/)Dec. 12, 2008 (Dec. 12, 2008), XP055407443. [retrieved on Sep. 18, 2017] p. 1644.

\* cited by examiner

Total number 435600   Min: 38
Mean value: 182.825   Max: 255
Std. Dev.: 45.480     Mode: 255 (29657)

METHOD AND DEVICE FOR DETERMINING THE COLOR HOMOGENEITY OF HAIR

CROSS-REFERENCE TO RELATED APPLICATION

This application is a U.S. National-Stage entry under 35 U.S.C. § 371 based on International Application No. PCT/EP2017/066576, filed Jul. 4, 2017, which was published under PCT Article 21(2) and which claims priority to German Application No. 10 2016 222 190.6, filed Nov. 11, 2016, which are all hereby incorporated in their entirety by reference.

TECHNICAL FIELD

The present disclosure relates to a method and a device for determining the color homogeneity of hair.

BACKGROUND

Coloring hair uniformly can represent an important cosmetic objective.

Apart from when it is sought to make a fashion statement, inhomogeneous coloring, for example comprising patches or streaks, can be undesirable.

Furthermore, it may likewise be undesirable if, starting from a potentially homogeneous hair coloring, color inhomogeneities develop over the course of time, for example caused by UV radiation, washing processes or the like.

The color homogeneity can thus represent an important consumer-relevant parameter.

A quantitative measure may be desirable for assessment of color homogeneity, in particular also for a comparison of color homogeneity for differently colored hairstyles and/or for an assessment as to how the color homogeneity of a colored hairstyle develops over the course of time. Accordingly, it is desirable to provide a method and device for determining the color homogeneity of hair. Furthermore, other desirable features and characteristics will become apparent from the subsequent detailed description and the appended claims, taken in conjunction with the accompanying drawings and the foregoing technical field and background.

BRIEF SUMMARY

In accordance with an exemplary embodiment, a method for determining the color homogeneity of hair is provided. The method comprises providing a digital image in which hair is depicted and which is parameterized in a color space that is defined by means of a parameter set in which one of the parameters is a hue. The method further includes defining at least one hair analysis region in the digital image, determining a hue distribution in the at least one hair analysis region, and determining at least one color homogeneity value on the basis of the determined hue distribution.

In accordance with another exemplary embodiment, a device for determining the color homogeneity of hair is provided. The device comprises a data processing device and a display device. The data processing device is configured to provide a digital image in which hair is depicted and which is parameterized in a color space that is defined by means of a parameter set in which one of the parameters is a hue. The data processing device is further configured to define at least one hair analysis region in the digital image, determine a hue distribution in the at least one hair analysis region, and determine at least one color homogeneity value on the basis of the determined hue distribution.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Reference is made in the following detailed description to the accompanying drawings, which form part of the present disclosure and in which specific embodiments are shown by way of illustration. In this regard, directional terms such as "above", "below", "ahead", "behind", "front", "rear", etc. are used in relation to the orientation of the described figure(s). Since components of embodiments can be positioned in a number of different orientations, the directional terms are used by way of illustration and are in no way limiting. It goes without saying that other embodiments can be used and structural or logical changes can be made without departing from the scope of protection of the present disclosure. The various exemplary embodiments described herein can be combined with one another unless specifically stated otherwise. The following detailed description therefore is not to be interpreted as limiting, and the scope of protection of the present disclosure is defined by the accompanying claims.

In various exemplary embodiments the color homogeneity of hairstyles can represent a target parameter that can be determined by employing image processing methods with a subsequent statistical analysis of a color angle.

In various exemplary embodiments the method for determining the color homogeneity of hair can be performed with only little or no equipment outlay. For example, the method can be performed by employing an app on a tablet or a smartphone. For example, this can allow a user to determine the color homogeneity of their hair, for example their hairstyle, even without professional assistance and without having to provide a hair sample for examination, for example using a smartphone or tablet for recording a digital image of the hair and with the color homogeneity being determined by employing the smartphone/tablet, wherein the smartphone/tablet can be used in various exemplary embodiments to provide the image to an external data processing device, for example a cloud, and to receive the results determined there and to display them to the user.

In various exemplary embodiments a method for determining the color homogeneity of hair is provided. The method may comprise the steps of providing a digital image in which hair is depicted and which is parameterized in a color space which is defined by employing a parameter set in which one of the parameters is a hue, determining and/or defining at least one hair analysis region in the digital image, determining a hue distribution in the at least one hair analysis region, and determining at least one color homogeneity value on the basis of the determined hue distribution.

In various exemplary embodiments the step of providing the digital image may comprise the transformation of an original digital image, which is parameterized in an original color space, into the color space, wherein the original color space may be different from the color space.

In various exemplary embodiments the step of providing the digital image may comprise the reading of the image parameterized in the color space, for example reading from a camera used to record the digital image.

In various exemplary embodiments the color space may be a hue-saturation-lightness color space.

In various exemplary embodiments the hue may be defined by a color angle on a color wheel.

In various exemplary embodiments the step of determining at least one color homogeneity value on the basis of the determined hue distribution may comprise determining a circular variance.

In various exemplary embodiments the step of determining and/or defining at least one hair analysis region may comprise defining the at least one hair analysis region by a user.

In various exemplary embodiments the step of defining the at least one hair analysis region by the user may comprise defining the position and/or shape and/or size of the hair analysis region.

In various exemplary embodiments the step of determining and/or defining at least one hair analysis region may comprise determining a hair display region in which the hair is displayed and defining at least part of the hair display region as the at least one hair analysis region.

In various exemplary embodiments the at least one hair analysis region may comprise the entire hair display region.

In various exemplary embodiments the at least one hair analysis region may comprise a plurality of hair display regions.

In various exemplary embodiments the plurality of hair analysis regions may differ from one another in their center-point position.

In various exemplary embodiments the method may also comprise creating a relation of the determined color homogeneity value to the center-point positions of the hair analysis regions.

For example, a spatial distribution of the color homogeneity in a hairstyle can thus be determined, for example in the event of inhomogeneous hue distribution of a hairstyle regions can be identified which have a particularly high homogeneity. In various exemplary embodiments these regions can be subjected to a secondary treatment, for example a secondary coloring.

In various exemplary embodiments the method may also comprise a step of displaying the determined results.

In various exemplary embodiments the method may also comprise a step of determining a hair treatment on the basis of the determined result and/or a step of evaluating the determined results, for example within the scope of creating and/or developing hairstyles in the field of hair coloring.

In various exemplary embodiments the displaying of the determined result may comprise a displaying of the digital image, wherein in the hair display region of the digital image the hair is displayed with the hue, wherein the overall hair display region is displayed with a uniform color saturation and a uniform lightness.

In various exemplary embodiments a device for determining the color homogeneity of hair is provided. The device may comprise a data processing device and a display device and may be designed to carry out the method for determining the color homogeneity of hair.

In various exemplary embodiments the data processing device and the display device may be part of a smartphone or a tablet.

In various exemplary embodiments the device can be designed to carry out the method in accordance with various exemplary embodiments by employing an app.

A digital image can be understood herein to mean a data packet which can be displayed by a data processing system as a two-dimensional (planar) arrangement of image dots (also referred to as pixels), for example in a coordinate system which has an x-axis and a y-axis, wherein each image dot comprises at least one image position as x,y-coordinate pair and intensity information, wherein the intensity information for example can be displayed as the color of a pixel of a monitor or a printed dot of a printed image. The digital image can be for example a photo recorded using a digital camera or an individual image of a video sequence recorded using a digital camera.

A "color" can be understood herein to mean a cooperation between a hue (i.e. a spectral color impression, which can be understood to be that which is considered to be the "actual color"), a color intensity (i.e. how intense the color appears, for example compared with a neutral grey, which is also referred to as saturation, color saturation, colorfulness, chromaticity or color depth) and a lightness or darkness (i.e. how light or dark the color appears).

For a color display, the color may be parameterized in a color space.

A conventional color space from which color information (for example hair color information of the colored hair or of the hair prior to the coloring, which is also referred to as the base hair color) originates or in which the color information is displayed is such that a determined or displayed color is independent of a medium by which the color is determined or displayed (for example color measuring device, screen, printer, scanner, human eye, etc.). The color space may be an L*a*b* color space, for example. Here, the hue can be parameterized for example by employing two parameters a* and b*.

Further conventional color spaces can be, for example, an RGB (parameterized red, green, blue) or CIELUV (the hue is parameterized here in an u-v plane) color space, which may be better suited for an additive light color, which for example is used in monitors, than for example the L*a*b* color space, or a CMYK color space, which, based on a subtractive color model, is used in particular in the field of multi-color printing and parameterizes colors in basic color printing corresponding to the four color channels cyan, magenta, yellow and black (color depth, key).

In order to illustrate various exemplary embodiments a comparison of the RGB color space is used herein, which shall be understood to be representative for all color spaces in which the hue does not represent an individual parameter, but is represented as a mixture of two or more parameters.

Figure 1A:
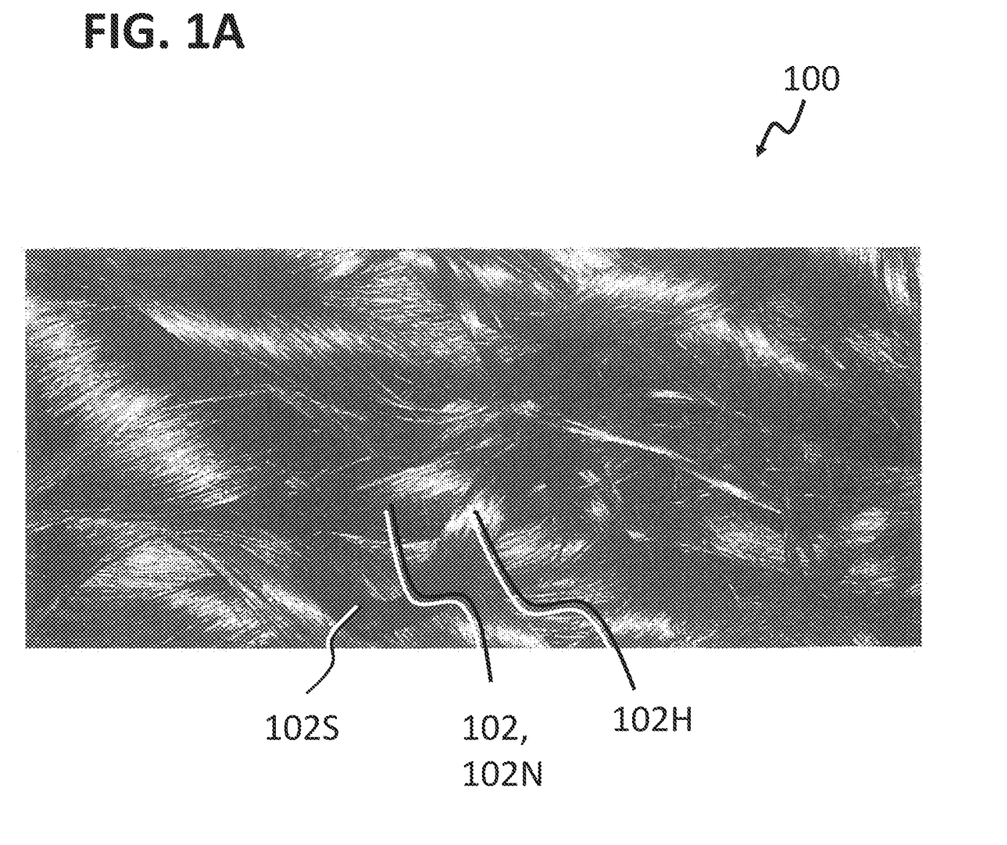
FIG. 1A shows a depiction of an image, parameterized in an RGB color space, of dyed hair for use in a method for determining the color homogeneity of hair in accordance with various exemplary embodiments.

FIG. 1A shows a greyscale depiction of an image, parameterized in an RGB color space, of (true blue) dyed hair 102 for use in a method for determining the color homogeneity of hair in accordance with various exemplary embodiments.

Although a color display of the colored hair 102 is not possible herein, in view of a correlation between a spatial distribution of grey values and a hair structure (regions of locks/strands of hair arranged at the top appear light, locks/strands of hair arranged at the bottom and regions in which locks of hair cross appear dark), it may still be visible on the basis of the greyscale image 100 that each image dot of the image 100 can form at least one superimposition of light and dark image components, which are intended to represent illuminated regions 102H and regions 102S arranged in the shade, with the color of the hair 102. Here, the points that are light on account of being illuminated and the points that are dark on account of being shaded have nothing to do with the color of the hair 102, and therefore have nothing to do with color homogeneity, or at least do not make it possible to determine the color homogeneity from the combined image.

Figure 1B:
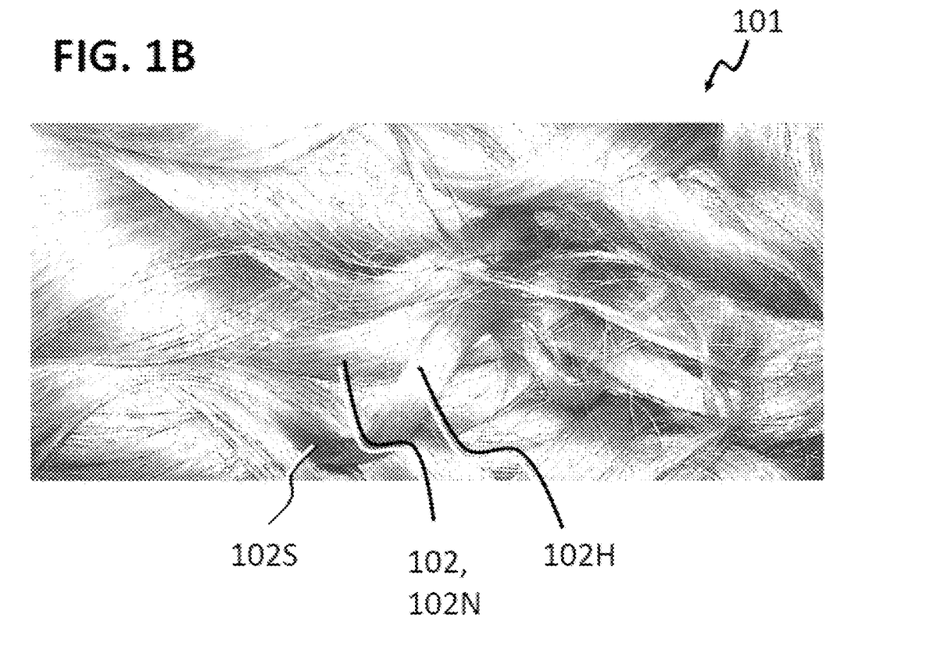
FIG. 1B shows a depiction of the B-channel of the image of the dyed hair from FIG. 1A.

FIG. 1B shows a greyscale depiction 101 of the blue channel (also referred to as the B channel) of the image 100 of the (true blue) colored hair 102 from FIG. 1A.

In a depiction of the blue hair in the blue channel of the RGB parametric image, it could be assumed that a substantially uniformly blue-colored image results (which could correspond in the greyscale display to a display with a uniform grey shade).

On the basis of the regions 102H and 102S still prominently illuminated and arranged in the shade in FIG. 1B (i.e. the correlation of hair structure and light/dark image regions), it can be seen, however, that an intensity of the image dots in the blue channel varies so as to reproduce the illuminated and shaded regions 102H and 102S as light and dark respectively in combination with the red and the green channel.

Figure 1C:
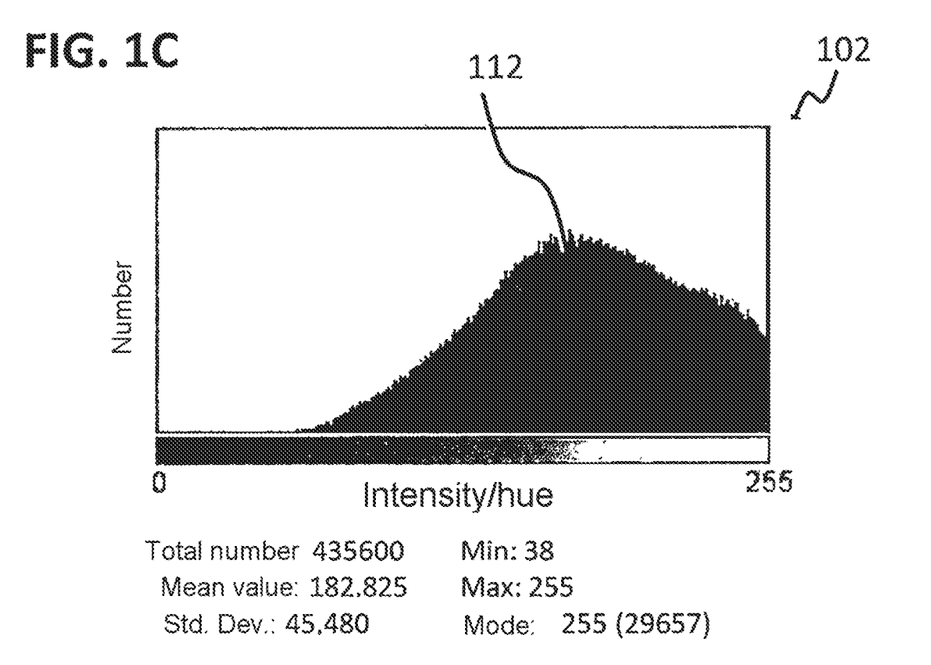
FIG. 1C shows a graphical depiction of an intensity value distribution of the B-channel of the image from FIG. 1A and FIG. 1B.

A great fluctuation breadth of the intensity of the image dots in the blue channel can also be seen on the basis of FIG. 1C, which shows a graphical depiction of an intensity value distribution (number of image dots depending on the intensity value) of the B-channel of the image from FIG. 1A and FIG. 1B.

A depiction in one of the RGB channels therefore is not suitable for estimating the color homogeneity of hair that is dyed a color corresponding to one of the parameterized channels, and it may be comprehensible that in the case of hair colors that would be displayed anyway already as mixtures of the color channels, such as brown or blonde, the estimation of the color homogeneity might be possible to an even lesser extent.

Figure 2A:
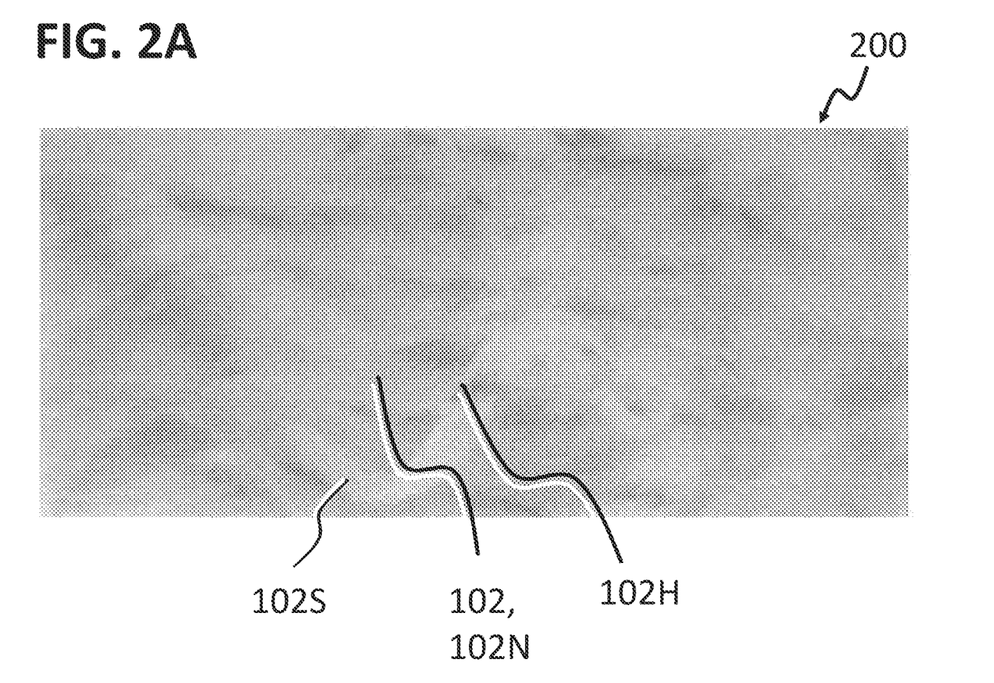
FIG. 2A shows a depiction of the image, transformed into the HSV color space, from FIG. 1A to FIG. 1C in a hue channel in accordance with various exemplary embodiments.

FIG. 2A in turn shows, as a greyscale depiction, a hue channel display 200 of a transformed image, wherein the transformed image was produced in accordance with various exemplary embodiments from the RGB image 100 from FIG. 1A by employing transformation in the hue-saturation-lightness value color space (also referred to as hue-saturation value (HSV) color space).

Figure 2B:
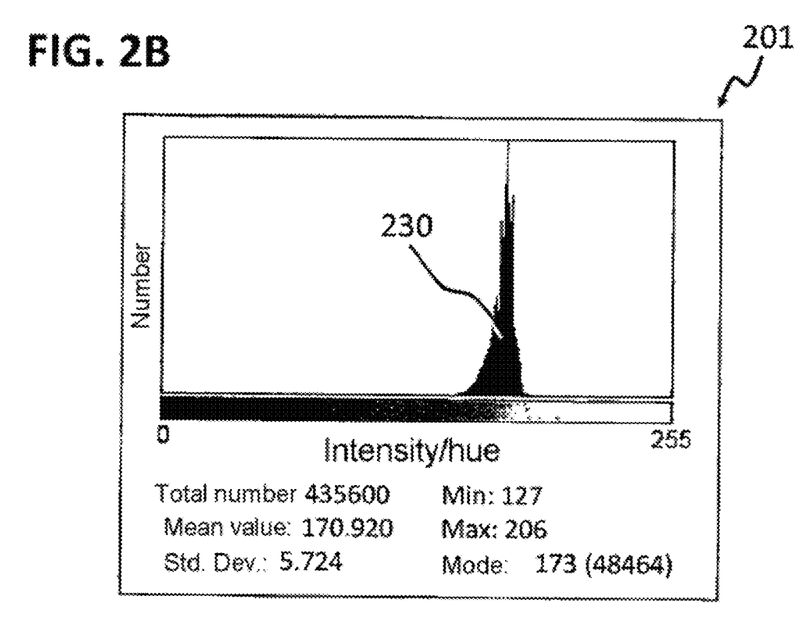
FIG. 2B shows a graphical depiction of an intensity/hue distribution of the hue channel of the image from FIG. 2A.

For the depictions in FIG. 2A and FIG. 2B a continuous circular hue value, which can be expressed as an angle greater than or equal to 0° and less than 360°, can be imaged onto a discrete distribution with 256 discrete hue values that are shown as 256 grey values of different intensity in the depiction in FIG. 2A.

In the hue channel depiction 200, a much more uniform hue value distribution (which is reproduced as a greyscale depiction) can be seen, which on the one hand no longer has the spatial correlation of the illuminated/shaded regions with the light/dark points respectively (which were still present in FIG. 1B; in FIG. 2A the same points as in 1A and FIG. 1B are marked, wherein the region 102S is no longer in an above-average dark part of the image, and the region 102H is no longer in an above-average light part of the image), and which on the other hand may correspond rather to a typical homogeneity of a hair coloring (apart from a deliberate production of strands and/or an improper or unsuccessful coloring).

This means that, by employing a conversion into HSV values (or into other color spaces that define a color angle, for example HSB, LCh), a complete separation of the hue information (hue) from lightness information can be attainable, and therefore an isolated consideration of the color homogeneity can be made possible.

FIG. 2B is a graphical depiction 201 of a hue frequency distribution of the hue channel (also referred to as hue distribution) of the image from FIG. 2A.

In FIG. 2B a substantially monomodal distribution 230 of the hue values with a small breadth can be seen.

In various exemplary embodiments the distribution of the hue values can be used to determine at least one color homogeneity value.

Statistical analysis methods can be used for example to determine a standard deviation (abbreviated in the drawings by Std.Dev.), also referred to as confidence interval d, a circular variance S and/or an angular deviation s of the hue distribution.

In the color spaces described below in greater detail which comprise the hue as an individual parameter and in which methods for determining the color homogeneity of hair can be used in accordance with different exemplary embodiments, the hue can be expressed as an angle that is greater than or equal to 0° and less than 360°.

In various exemplary embodiments circular statistics therefore can be applied for the statistical analysis of the hue distribution. With the aid of circular statistics it may be possible, inter alia, to avoid homogeneities with a transition from about 359° to 0° (such inhomogeneities would lead, in the case of application of the conventional linear statistical methods, to a mean value from about 10° and about 350° of about 180°, instead of the expedient value of 0°).

The angles $\alpha_i$ associated with the hues in various exemplary embodiments can be converted firstly into unit vectors in a two-dimensional plane.

$$r_i = \begin{pmatrix} \cos \alpha_i \\ \sin \alpha_i \end{pmatrix}.$$

In order to obtain a mean angle $\bar{\alpha}$ the unit vectors can be averaged in various exemplary embodiments:

$$\bar{r} = \frac{1}{N} \sum_i r_i$$

The mean angle $\bar{\alpha}$ can be determined from the averaged vector $\bar{r}$, optionally with specification of a confidence interval, for example of about 95% inverse tangent function by conversion by employing the four quadrants.

A vector length $$R = |\bar{r}|,$$

which can lie between 0 and 1, can already represent a measure for the color homogeneity of the hair, because the greater is the color homogeneity, the closer the angles associated with the hues can be to one another, and the longer (i.e. the closer to 1) the vector length R can be.

A circular variance can be provided in various exemplary embodiments as a measure for the color homogeneity.

$$S = 1 - R$$

This also lies between 0 and 1, but is all the lower, the closer the angles are to one another.

Furthermore, an angle standard deviation (also referred to as angle deviation) can be used as a measure for the color homogeneity.

$$s = \sqrt{2(1-R)}$$

Furthermore, further values known in circular statistics which provide a measure for a distribution, for example a scattering, of the hues can be used.

The circular statistics can be performed by employing any suitable software, for example by employing an independently created software, for example an app, or for example by employing provided software packages, for example Oriana or the EXCEL tool EX-Rose.

Figure 3A:
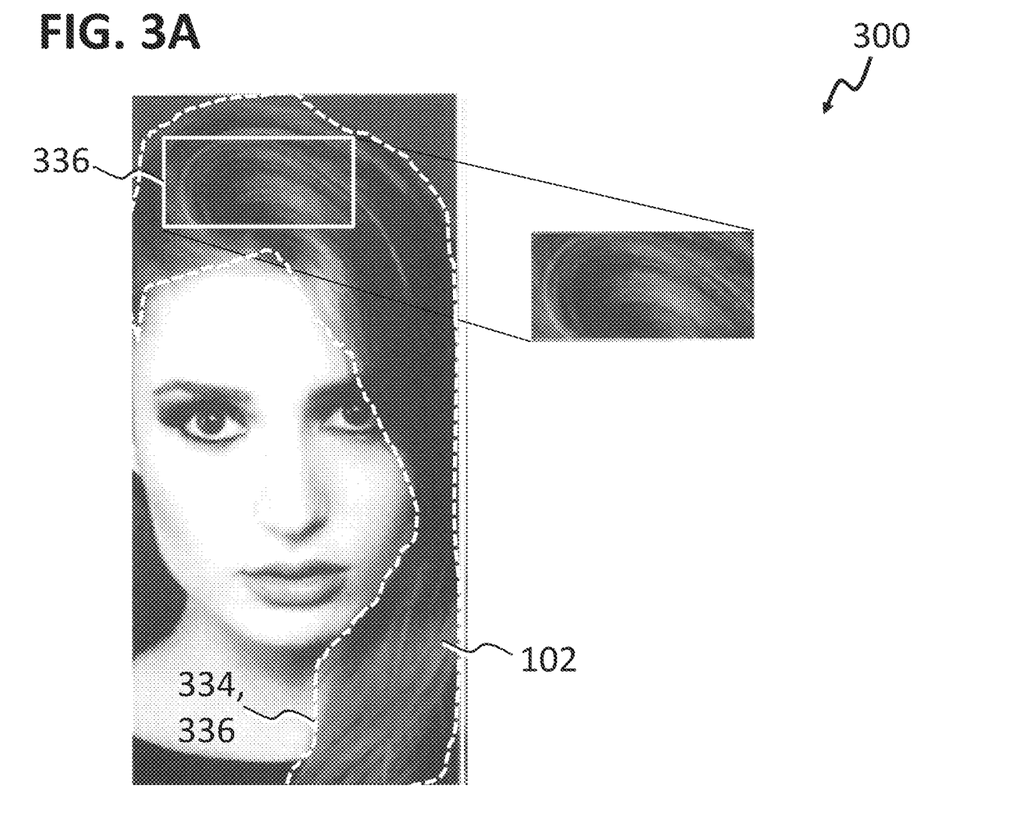
FIG. 3A shows a depiction of an image, parameterized in an RGB color space, of dyed hair for use in a method for determining the color homogeneity of hair in accordance with various exemplary embodiments.

In the digital image, as shown in FIG. 3A, a hair display region 334, i.e. a region in which hair is depicted, can be determined by employing known methods in accordance with various exemplary embodiments. The known method for example can comprise an exemption procedure, as can be usual for example in Photoshop and other software packages.

The hair display region 336 may comprise a plurality of image dots of a digital image 100, which depict the hair 102 and which can form a continuous area existing of a plurality of individual areas. A plane in which the hair region can be arranged can be determined for example by the x-axis and the y-axis of the digital image.

In various exemplary embodiments at least one hair analysis region 336 can be determined and/or defined in the digital image.

In the exemplary embodiment shown in FIG. 2A and FIG. 2B the hair analysis region 336 comprises substantially the entire region of the digital image and is rectangular.

In various exemplary embodiments the hair analysis region 336 may comprise a partial region of the hair analysis region 334.

Figure 3B:
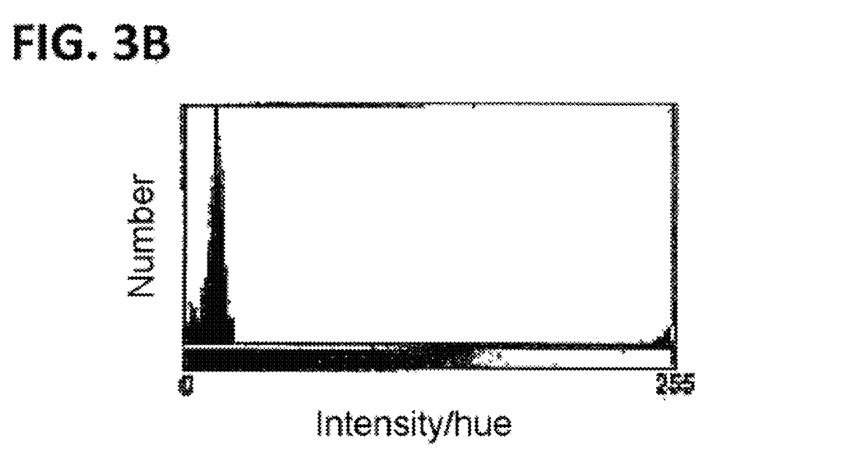
FIG. 3B shows a graphical depiction of an intensity/hue distribution of the hue channel of the image from FIG. 3A.

In the exemplary embodiment shown in FIG. 3A one of the hair analysis regions 336 for which the distribution shown in FIG. 3B was determined comprises merely a (rectangular) partial region of the hair display region 334.

In various exemplary embodiments the digital image may also comprise, in addition to the hair display region 334, further display regions in which for example objects, body parts, etc. may be displayed. The hair analysis region 336 may be selected in various exemplary embodiments such that no part of the other display regions falls in the hair analysis region 336.

In various exemplary embodiments the hair analysis region 336 may have any form, for example the hair analysis region 336, apart from being rectangular (for example square), may also be triangular, polygonal with a number of sides other than three or four, elliptical, round or shaped in any other way. For example, the hair analysis region 336 may comprise the entire hair display region 334.

In various exemplary embodiments in which the hair analysis region 336 comprises the entire hair display region, the hair analysis region 336 may consequently have a one-part or multi-part area which can be examined for a subsequent analysis, for example for a determination of a value for a proportion of linear regions and/or for a distribution of linear regions, even in the case of the multi-part area as a single hair analysis region 336.

In various exemplary embodiments the at least one hair analysis region 336 may comprise a plurality of hair display regions 336. In various exemplary embodiments each of the plurality of hair analysis regions 336 can be examined separately in a subsequent analysis, for example when determining a color homogeneity value, of each of the plurality of hair analysis regions 336, i.e. the value for the color homogeneity of the hair can be determined separately for each of the plurality of hair analysis regions 336.

In various exemplary embodiments the determination of the at least one hair analysis region 336 can comprise the determination of the hair display region 334 and the defining of the at least one hair analysis region 336.

For example, the defining of the at least one hair analysis region 336 may mean that, as described above, the entire hair display region is defined as the hair analysis region 336, and/or one or more hair analysis region(s) 336 can be defined, for example in an automated manner, by employing the data processing device, for example with inclusion of predetermined conditions. For example the size and/or number of hair analysis regions 336 can be predefined, for example by employing a user, and the hair analysis regions 336 can then be defined in an automated manner, for example by employing a suitable software, for example such that a minimum distance is maintained between the hair analysis regions 336, the hair display region is covered as uniformly as possible, and the like.

In various exemplary embodiments the color homogeneity for colored hair and/or for uncolored hair can be determined.

In various exemplary embodiments the color homogeneity can be determined both before coloring and after coloring. In various exemplary embodiments a relationship can be determined between the color homogeneity before the coloring and the color homogeneity after the coloring, for example for a plurality of colorings, on the basis of the results. Here, further parameters that describe the hair to be colored can be incorporated in various exemplary embodiments, for example a degree of greying and/or previous damage to the hair.

In various exemplary embodiments the color homogeneity can be determined as a function of time, for example a change over time to the color homogeneity can be determined after one hair washing or a plurality of hair washings, at certain time intervals after exposure to UV light, or the like.

In various exemplary embodiments the hue channel can be displayed, for example to a user, for example with use of a display, for example a screen display.

In various exemplary embodiments the hue channel can be transformed back into a color space suitable for the display (for example RGB for a screen display or CMYK for a printer), with the other channels (saturation, value) being masked out, such that merely the hue differences possibly contribute to a different display of various image dots, but a realistic display can be provided in respect of the hues and the distances of the different hues.

In various exemplary embodiments different hues that do not correspond to the determined hues can be allocated to the different hues of the hue channel (in other words, the different hue values of the hue parameter). Thus, it can be made possible for example to display small hue differences in an exaggerated manner.

Figure 4:
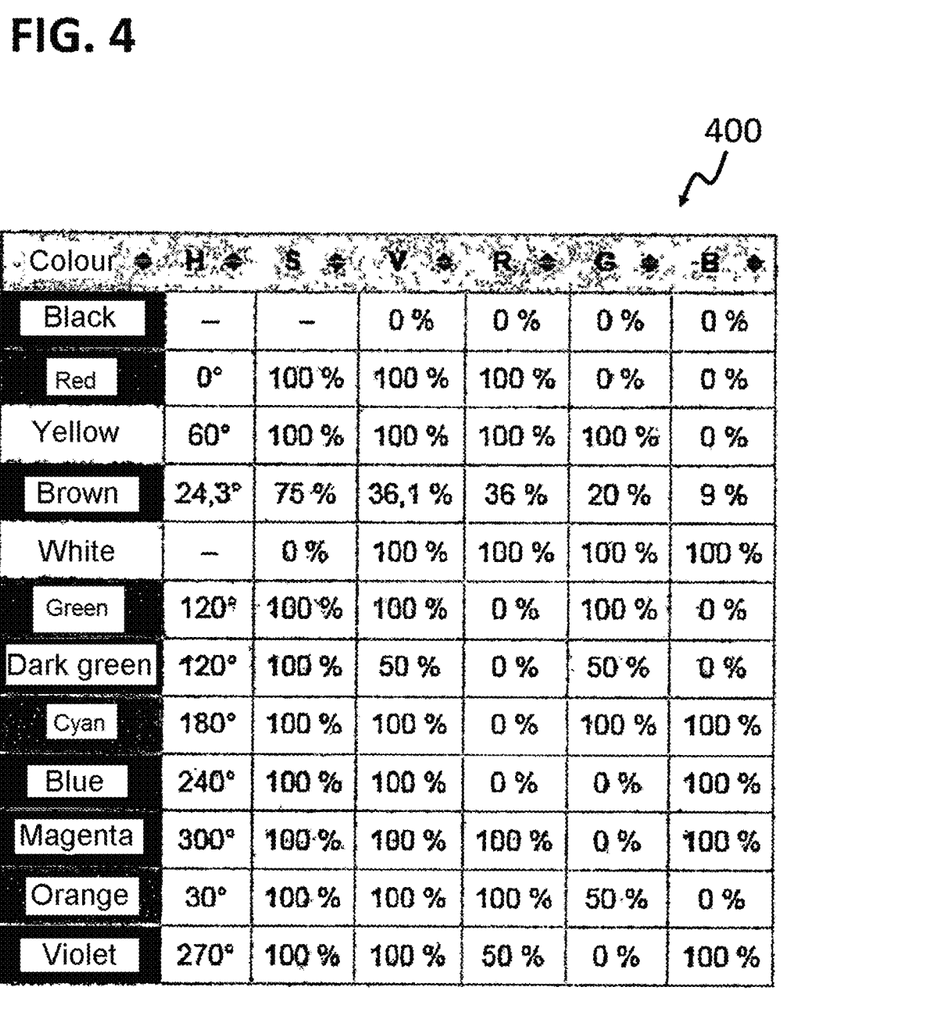
FIG. 4 shows a table with a comparison of color values in an RGB color space and an HSV color space.

FIG. 4 shows a table 400 with a comparison of color values in an RGB color space and an HSV color space.

The RGB color space may be an additive color space which emulates the color perceptions by the additive mixing of three basic colors (red, green and blue).

A possible conversion from RGB to HSV can be described as follows:

Precondition: $R, G, B \in [0, 1]$ $\text{MAX} := \max(R, G, B), \text{MIN} := \min(R, G, B)$ $$H := \begin{cases} 0, & \text{if } \text{MAX} = \text{MIN} \Leftrightarrow R = G = B \\ 60° \cdot \left(0 + \frac{G - B}{\text{MAX} - \text{MIN}}\right), & \text{if } \text{MAX} = R \\ 60° \cdot \left(2 + \frac{B - R}{\text{MAX} - \text{MIN}}\right), & \text{if } \text{MAX} = G \\ 60° \cdot \left(4 + \frac{R - G}{\text{MAX} - \text{MIN}}\right), & \text{if } \text{MAX} = B \end{cases}$$

if $H < 0°$, then $H := H + 360°$ $$S_{HSV} := \begin{cases} 0, & \text{if } \text{MAX} = 0 \Leftrightarrow R = G = B = 0 \\ \frac{\text{MAX} - \text{MIN}}{\text{MAX}}, & \text{otherwise} \end{cases}$$

$$S_{HSL} := \begin{cases} 0, & \text{if } \text{MAX} = 0 \Leftrightarrow R = G = B = 0 \\ 0, & \text{if } \text{MIN} = 1 \Leftrightarrow R = G = B = 0 \\ \frac{\text{MAX} - \text{MIN}}{1 - |\text{MAX} + \text{MIN} - 1|}, & \text{otherwise} \end{cases}$$

$V := \text{MAX}$ $L := \frac{\text{MAX} + \text{MIN}}{2}$

Postcondition: $H \in [0°, 360°], S, V, L \in [0, 1]$

These formulas can reflect some of the characteristics of the HSV values. For example, if R=G=B, H may be irrelevant, and therefore, by definition, H=0. If R=G=B=0, then S may be irrelevant, and therefore, by definition, S=0.

In various exemplary embodiments for example HSL, HSB or HSI can be used instead of HSV-modified color models.

The HSL color space (also referred to as HLS) may comprise the parameters constituted by hue (also referred to as color angle) H, color saturation S, and color lightness L. In contrast to the HSV color space, however, it may be based on the grey point between white and black as neutral grey. The color body may be displayed as a double cone, cylinder or six-sided prism. The hues (values of colorfulness) may be provided in an outer position, and the grey point in the middle. The CIE-LCh° model with color lightness L, color saturation (colorfulness) C, and the hue angle h° can be constructed similarly, whereby it can correspond to a certain extent to a Lab color space displayed in cylinder coordinates.

The HSB and the HSI model can be oriented to the requirements of colorimetry and phototechnical reproduction. Here as well, H may stand for the hue (colorfulness value), and S may stand for saturation. The difference may relate to the third coordinate: on the one hand HSB with the radiation property of lightness, for example absolute lightness, B, and on the other hand as HSI color model with the light intensity I.

Figure 5:
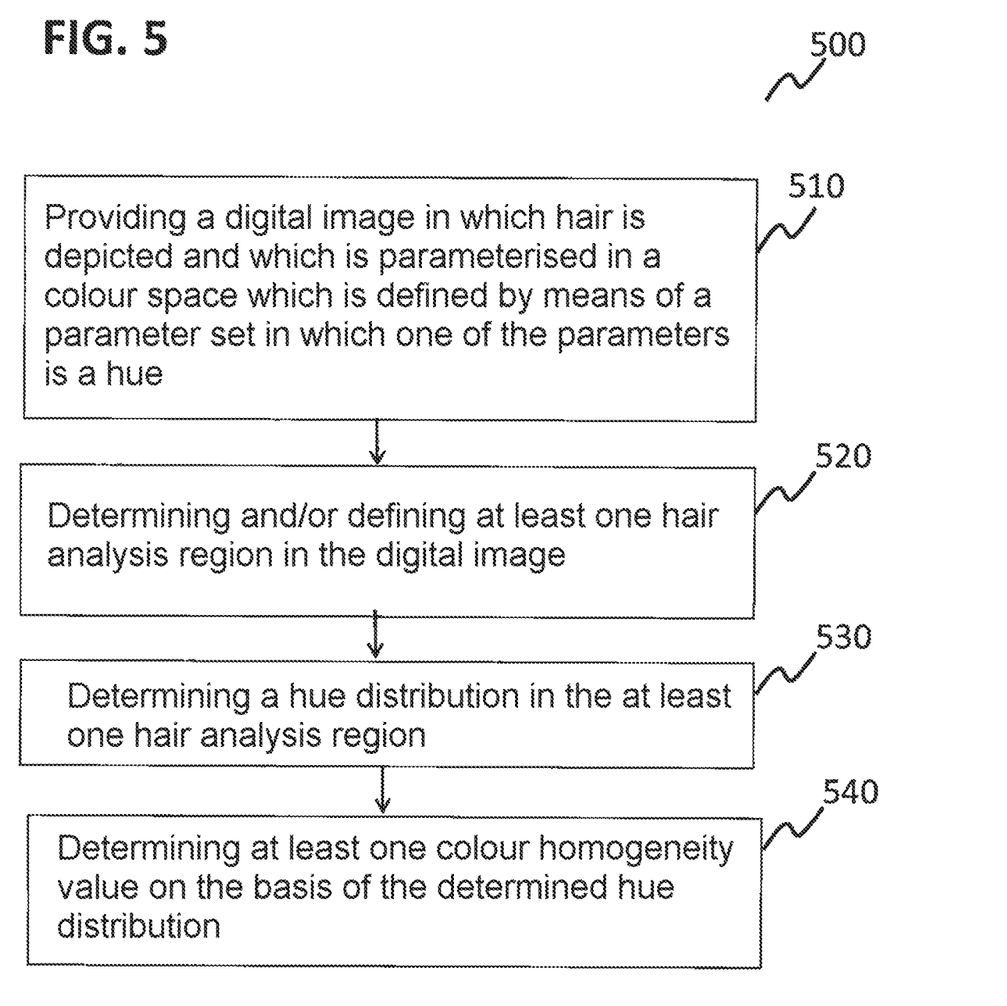
FIG. 5 shows a flow chart of a method for determining the color homogeneity of hair in accordance with various exemplary embodiments.

FIG. 5 shows a flow chart 500 of a method for determining the color homogeneity of hair in accordance with various exemplary embodiments.

In various exemplary embodiments the method may comprise the steps of providing a digital image in which hair is depicted and which is parameterized in a color space which is defined by employing a parameter set in which one of the parameters is a hue (at 510), determining and/or defining at least one hair analysis region in the digital image (at 520), determining a hue distribution in the at least one hair analysis region (at 530), and determining at least one color homogeneity value on the basis of the determined hue distribution (at 540).

Figure 6:
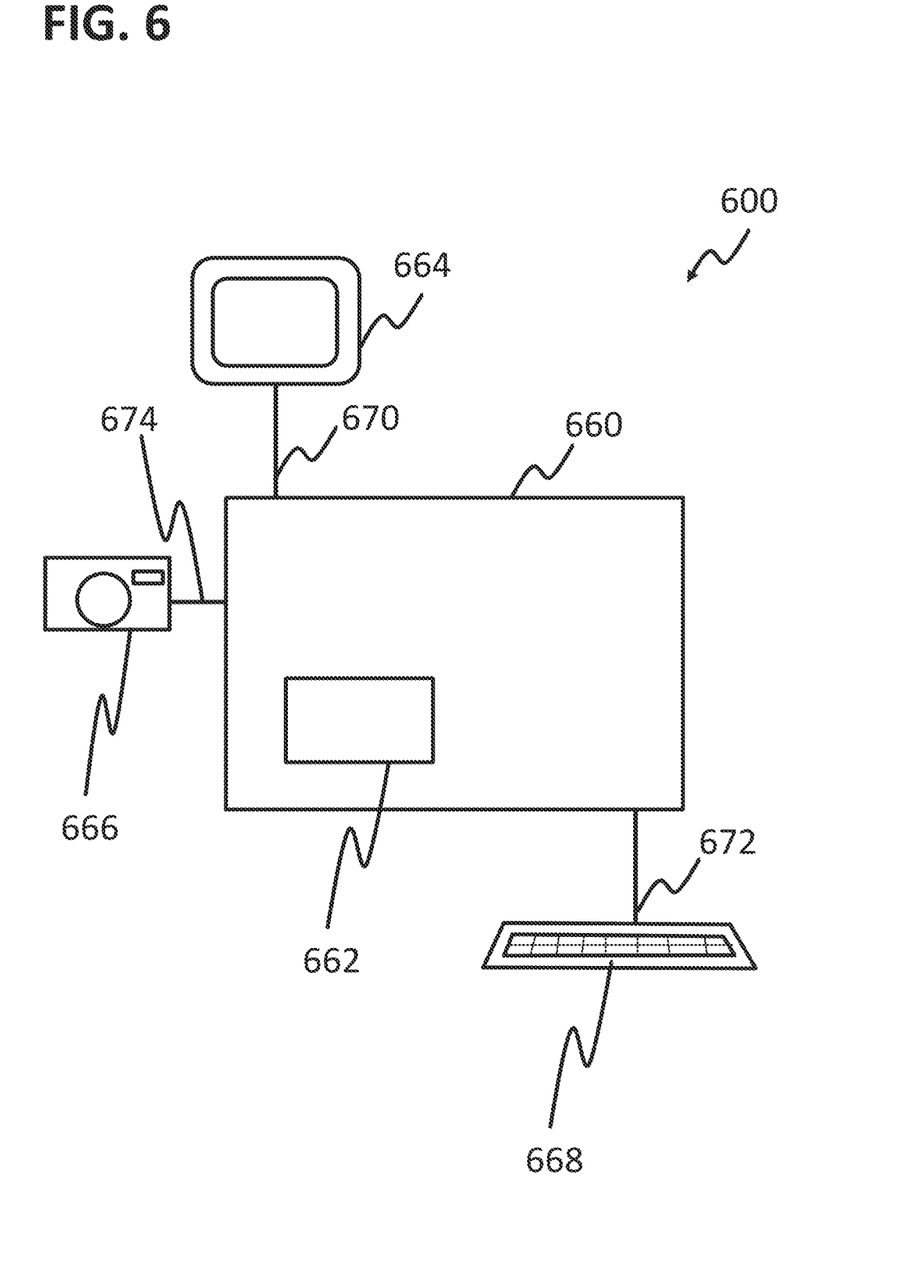
FIG. 6 shows a graphical depiction of a data processing device for carrying out a method for determining the color homogeneity of hair in accordance with various exemplary embodiments.

FIG. 6 shows a graphical depiction of a device 600 for determining the color homogeneity of hair in accordance with various exemplary embodiments.

In various exemplary embodiments the device 600 may comprise a data processing device 660 for determining the color homogeneity of hair.

The data processing device 660 may be for example a computer, a tablet, a smartphone, a laptop, a smartmirror or any other data processing device which is suitable for carrying out the method for computer-assisted hair color consultation according to various exemplary embodiments. By way of simplification, the data processing device 660 herein is also referred to as a computer 660. The data processing device 660 may comprise a processor 662, for example a microprocessor.

In various exemplary embodiments the device 600 may comprise a display device 664 for determining the color homogeneity of hair.

The display device 664 may be for example the screen of a smartphone, of a PC, of a laptop, of a smartmirror, or of another device 600 for determining the color homogeneity of hair. The display device 664 may be used for example to display results of the method for determining the color homogeneity of hair, or for requesting input parameters for carrying out the method, or the like.

The display device 664 may be connected to the data processing device 660 by employing a first data connection 670. The display device 664 may exchange data with the data processing device 660 by employing the first data connection 670. In the case in which the device 600 comprises a smartphone, a tablet or the like, the display device 664 and the first data connection 670 may be integrated in the device 600.

In various exemplary embodiments the device 600 may comprise a camera 666 for determining the color homogeneity of hair.

The camera 666 can be designed in accordance with various exemplary embodiments to record a digital image 100 of hair 102, for example hair of a user.

The at least one camera 666 in accordance with various exemplary embodiments may comprise a digital camera or a video camera, i.e. a camera which can be designed to record a plurality of individual images as a time sequence.

In various exemplary embodiments the device 600 may comprise a second data connection 674 between the computer 660 and the camera 666 for determining the color homogeneity of hair. Data can be transmitted from the computer 660 to the camera 666 by employing the second data connection 674, for example for (for example conventional) software control of the camera 666. Furthermore, data, for example the digital image(s) recorded by the camera 666, can be transmitted to the computer 660 by employing the second data connection 674. In the case in which the device 600 comprises a smartphone, a tablet or the like, the camera 666 and the second data connection 674 may be integrated in the device 600.

In various exemplary embodiments it is possible in the device 600 for determining the color homogeneity of hair to dispense with a camera 666, for example if the data processing device 660 is provided with the digital image 100 in some other way, for example by employing data transmission.

The data processing device 660 can be designed to process the image, received from the camera 666 or in some other way, by employing an image processing software, for example with use of the processor 662, for example so as to determine the hair display region in the received image in the known manner and so as to determine the color homogeneity of hair as described above for various exemplary embodiments. The image processing software can comprise an app in various exemplary embodiments.

In various exemplary embodiments the data processing device 660 may comprise an input device 668 for providing information to the data processing device 660, for example a keyboard, a mouse, a touch-sensitive surface of the display device 664, or the like.

The input device 668 may be connected to the data processing device 660 by employing a third data connection 672. The input device 668 may exchange data with the data processing device 660 by employing the third data connection 672. In the case in which the device 600 comprises a smartphone, a tablet or the like, the input device 668 and the third data connection 672 may be integrated in the device 600.

Further advantageous embodiments of the method will become clear from the description of the device, and vice versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for determining the color homogeneity of hair, the method comprising the steps of:
    providing a digital image in which hair is depicted and which is parameterized in a color space which is defined by use of a parameter set in which one of the parameters is a hue;
    defining at least one hair analysis region in the digital image;
    determining a hue distribution in the at least one hair analysis region; and
    determining at least one color homogeneity value on the basis of the determined hue distribution.

2. The method according to claim 1,
    wherein providing the digital image comprises transforming an original digital image, which is parameterized in an original color space, into the color space, wherein the original color space is different from the color space.

3. The method according to claim 1,
    wherein the color space is a hue-saturation-lightness color space.

4. The method according to claim 1,
    wherein the hue is defined by a color angle on a color wheel.

5. The method according to claim 1,
    wherein determining at least one color homogeneity value on the basis of the determined hue distribution comprises determining a circular variance.

6. The method according to claim 1,
    wherein defining at least one hair analysis region comprises defining the at least one hair analysis region by a user.

7. The method according to claim 6,
    wherein defining the at least one hair analysis region by the user comprises defining a position, a shape, a size, or a combination of two or more of these of the hair analysis region.

8. The method according to claim 1,
    wherein defining at least one hair analysis region comprises:
    determining a hair display region in which the hair is displayed; and
    defining at least part of the hair display region as the at least one hair analysis region.

9. The method according to claim 8,
    wherein the at least one hair analysis region comprises the entire hair display region.

10. The method according to claim 8,
    wherein the at least one hair analysis region comprises a plurality of hair display regions.

11. The method according to claim 10,
    wherein the plurality of hair display regions differ from one another in their center-point positions.

12. The method according to claim 11, further comprising a step of:
    creating a relation of the determined at least one color homogeneity value to the center-point positions of the hair display regions.

13. The method according to claim 1, further comprising a step of:
    displaying the determined at least one color homogeneity value.

14. The method according to claim 13,
wherein the displaying of the determined at least one color homogeneity value comprises a displaying of the digital image, wherein in the hair display region of the digital image the hair is displayed with the hue, wherein the overall hair display region is displayed with a uniform color saturation and a uniform lightness.

15. A device for determining the color homogeneity of hair,
comprising:
a data processing device; and
a display device;
wherein the data processing device is configured to:
provide a digital image in which hair is depicted and which is parameterized in a color space that is defined by use of a parameter set in which one of the parameters is a hue;
define at least one hair analysis region in the digital image;
determine a hue distribution in the at least one hair analysis region; and
determine at least one color homogeneity value on the basis of the determined hue distribution.

16. The device according to claim 15,
wherein configured to define at least one hair analysis region comprises:
configured to determine a hair display region in which the hair is displayed; and
configured to define at least part of the hair display region as the at least one hair analysis region.

17. The device according to claim 15,
wherein configured to define at least one hair analysis region comprises configured to define a plurality of hair display regions.

18. The device according to claim 17,
wherein configured to define the plurality of hair display regions comprises configured to define the plurality of hair display regions that differ from one another in their center-point positions.

19. The device according to claim 18, wherein the data processing device is further configured to create a relation of the determined at least one color homogeneity value to the center-point positions of the hair display regions.

20. The device according to claim 15, wherein the display device is configured to display the at least one color homogeneity value.

* * * * *